June 8, 1948.  H. E. ALLEN  2,442,835
PROCESS CYCLE CONTROLLER
Filed Jan. 21, 1941  2 Sheets-Sheet 1

INVENTOR
Harold E. Allen
BY
E. C. Sanborn
ATTORNEY

June 8, 1948.  H. E. ALLEN  2,442,835
PROCESS CYCLE CONTROLLER
Filed Jan. 21, 1941  2 Sheets-Sheet 2
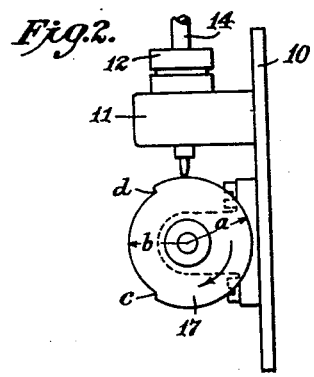
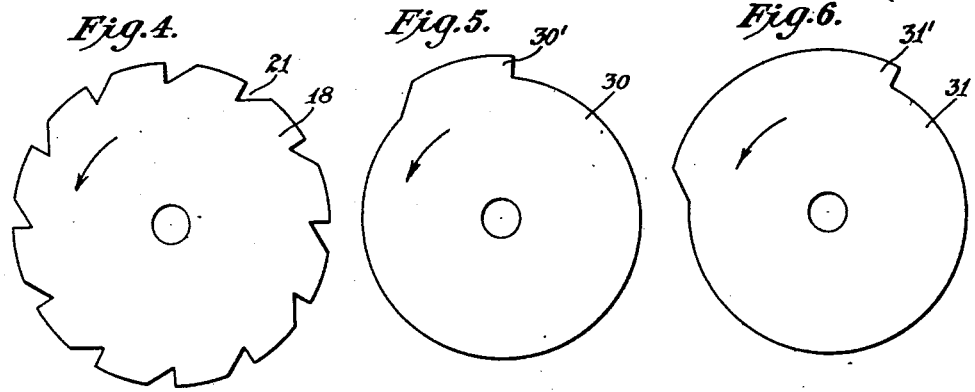
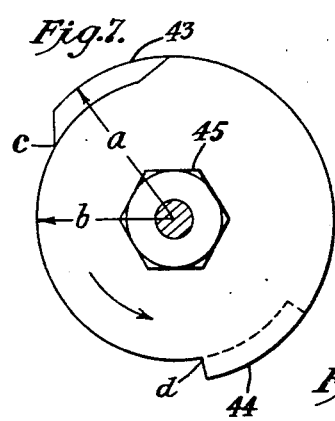
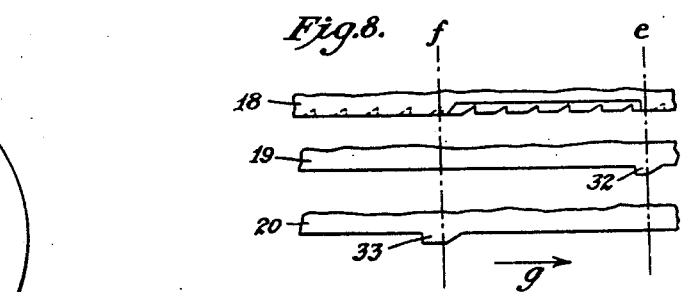
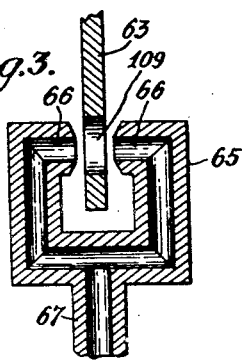
INVENTOR
Harold E. Allen
BY
E. C. Sanborn
ATTORNEY Patented June 8, 1948

2,442,835

UNITED STATES PATENT OFFICE 2,442,835

PROCESS CYCLE CONTROLLER

Harold E. Allen, Akron, Ohio, assignor to The Bristol Company, Waterbury, Conn., a corporation of Connecticut Application January 21, 1941, Serial No. 375,097

5 Claims. (Cl. 161—7)

This invention relates to process cycle controllers, and more especially to a form of controller in which segregation may be obtained between the timing of certain events which occur in relatively rapid succession and other events which are separated by considerable intervals of time.

In the automatic control of discontinuous process cycles it is frequently found desirable to group certain events having to do with the opening or closing or locking of presses or molds or the like in a more or less fixed timing relationship, while other elements of the cycle such as curing or cooling of the material under treatment may be required to extend over adjustable periods of time relatively great as compared with those characterizing the operation of the controlled mechanism. If an attempt is made to incorporate all these controls in a single mechanism operating at a constant speed, the cams or the like by which the various operations are commanded will require to be cut with great precision and operated under extremely precise speed control. Otherwise the timing of the long intervals may be far from exact and that of the short intervals may be similarly indefinite. Various attempts have been made to develop for this class of work cycle controls in which the cams or control elements may be moved selectively at two speeds, one corresponding to the rapidly succeeding events, and the other to the extended time intervals. Such a controller is shown in U. S. Letters Patent No. 2,050,614, granted to the applicant's assignee, August 11, 1936. In the performance of more intricate process cycle controls it frequently becomes desirable to carry out in succession a considerable number of events which individually must be performed with considerable rapidity but which must be separated by extended periods of time, all independently adjustable to suit different products and materials. For work of this class it has been found expedient to employ a controlling instrument in which the events characterizing the cycle are made subject to the operation of a mechanism which is periodically advanced at the termination of each of the extended time intervals so as to establish a new condition, and then caused to remain at rest until the establishment of a further condition is required.

It is an object of this invention to provide a process cycle controller in which a number of events may be separately and individually controlled, and the time intervals separating said events positively established and yet readily subject to change if desired.

It is a further object of the invention to provide a cycle controller of the above-named class in which a certain group of time intervals characterizing a predetermined cycle may be definitely established on a removable member of the instrument, so that changes from one cycle to another may readily be effected with a minimum of delay.

It is a further object of this invention to provide a controller of the above named class which shall be flexible and readily adaptable to a large variety of process cycles without material change in the operating elements of the mechanism.

Other features and advantages of the invention will be hereinafter described and claimed.

In the accompanying drawings:

Fig. 2 is an end elevation of certain elements of the mechanism shown in Fig. 1.

Fig. 3 is a sectional side elevation of a valve element forming a part of the mechanism.

Figure 1:
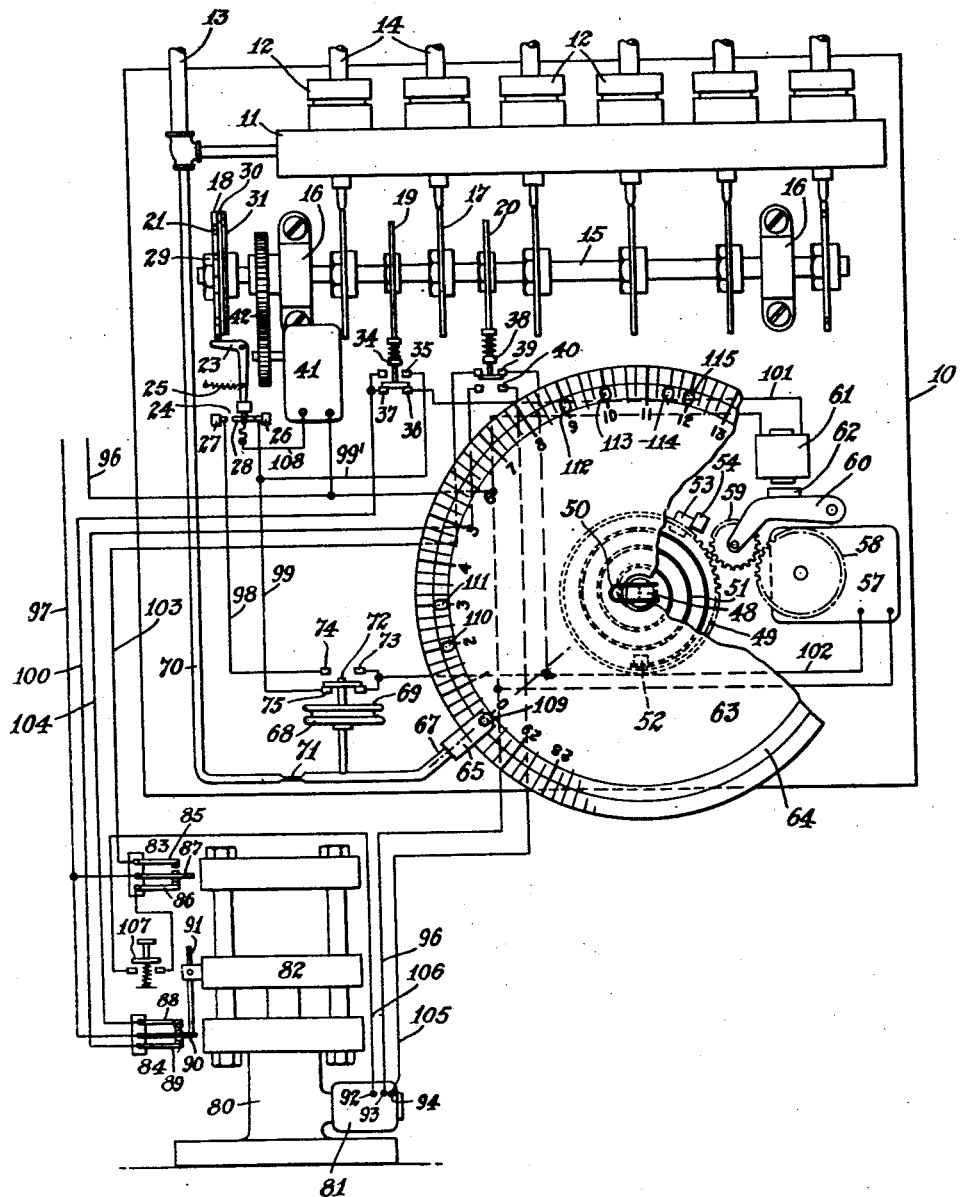
Fig. 1 is a front elevation of a cycle controller embodying the principles of the invention and adapted to the control of an electrically operated platen press for a process cycle involving the operation of a plurality of pneumatically actuated valves in a predetermined sequence.

Figs. 4, 5, and 6 are end elevations to a somewhat enlarged scale of several of the cam elements utilized in the mechanism for the purpose of timing the occurrence of events.

Fig. 7 is an end elevation of a typical form of a cam adapted to the actuation of a pilot valve.

Fig. 8 diagrammatically represents a development of the contours of certain cam elements utilized in timing the performance of the instrument.

Referring now to the drawings:

Fig. 1 shows a cycle controller embodying the principles of the invention, connected to control the operation of an electrically operated platen press such as may be used in the curing of plastics and of rubber compounds. Under operating conditions there would be associated with this press various pneumatically actuated diaphragm valves for the purpose of controlling the admission of steam or other curing agents to the molds. As these valves form no part of the invention, they are, for purposes of clarity, omitted from the drawings; and only the pilot valves through which they would be controlled specifically shown.

A base plate 10 has mounted thereon a valve block 11 carrying a plurality of pilot valves 12, preferably of the type shown in U. S. Letters Patent No. 1,890,494, issued to the applicant's assignee, December 13, 1932. The conduit 13 serves as a source of supply for compressed air to the valve block 11 and thence through the valves 12 to conduits 14, leading to the diaphragm valves under control. A shaft 15 journaled in bearings 16 mounted upon plate 10 carries a plurality of cam elements 17 adapted to actuate the valves 12 and to control the passage of air therethrough in accordance with the radius of the portion of the cam in engagement with the corresponding valve, as will hereinafter be explained in further detail.

Carried by the shaft 15 are three additional cams 18, 19, and 20 adapted to the actuation of electrical circuit-controlling devices for the operation of the controlling instrument. Cam member 18 is, for example, provided with twelve similar indentations or notches 21 adapted to coact with a follower 23 in controlling a double-throw contact device 24. The follower 23 is biased, by means of a spring 25, into engagement with the rim of the cam 18, so that the spring will tend to force the follower into the indentations 21, as they pass within its range. The contact device 24 includes two sets of contacts 26 and 27 adapted alternatively to engage a common contact element 28, whereby said device functions as a single-pole double-throw switch, the elements of the same being so disposed that when the follower 23 rests upon the rim of the cam 18 the element 28 will be brought into engagement with the contact 26 and disengaged from the contact 27, and when the follower is moved under influence of the spring 25 into any one of the indentations 21, said element 28 will be disengaged from contact 26 and engaged with contact 27.

Mounted upon the same hub as cam 18, and adapted to be clamped thereto as by a nut 29 are one or more overlapping plates 30, 31 (see Figs. 5 and 6). Each of these plates has a portion of its periphery of radius equivalent to that at the bottom of the indentations 21, and a projecting part or a dwell of a radius equivalent to the maximum radius of the cam 18. These plates may be provided with their projecting parts subtending various angles, corresponding to various numbers of the indentations 21 to be blocked out of the cycle. For example, the projection 30' on plate 30 is shown as subtending such an angle that it can be made to span either one or two of the notches, according to its position, and present a continuous rim for engagement by the follower 23, whereby said notches are blocked out and become ineffective. In a similar manner, the projection 31' on plate 31 is cut to block out either three or four notches, according to its position. Thus, with these two plates used singly or in conjunction, it is possible to block out any number of the notches or indentations up to six. By providing other plates, other numbers can be blocked out, so that the total number of effective notches in the cam 18 may be made of any selected value according to the number of operations represented by the cycle to be controlled.

Cam member 19 bears on its periphery a single projecting part 32 of larger radius, and subtending a relatively small angle; and cam 20 bears a similar part 33 (see Fig. 8), both of said parts 32 and 33 being positioned at any desired points with respect to the peripheries of said cams. Associated with cam member 19, and operable thereby, is a contactor 34, functioning as a double-throw switch with contacts 35 and 36 adapted to be connected selectively to a common contact element 37, according to whether the contactor engages the smaller radius portion or the part 32, of the cam periphery. Associated with cam member 20, and operable thereby, is a contactor 38, having contacts 39 and 40, so disposed that contact 39 is closed and contact 40 opened when the contactor 38 is engaged by the smaller radius portion of the periphery of the cam 20, while contact 40 is closed and contact 39 opened when said contactor is engaged by the part 33 of said cam. A constant speed electric motor 41 mounted upon the plate 10 acts through a gear train 42 to rotate the shaft 15 whereby said cam members are carried.

Referring to the Fig. 7 wherein is shown an end elevation of one of the valve-actuating cams 17 it will be seen that respective portions of the cam periphery have different radii as at a and b. The proportioning of the engaging parts is such that when the valve actuating mechanism is in contact with the portion of the cam having the larger radius a, said valve will be opened to allow the passage of air therethrough, and when in engagement with the portion b, the valve will be closed. It will be obvious, therefore, that the opening and closing respectively of the pilot valve will correspond to the transitions of the engaging part of the same from the radius b to the radius a, as at c, and from the radius a to the radius b, as at d, with the cam rotating in a counter-clockwise sense as shown by the arrow in Fig. 7. Each of the cams may be cut to open and close its associated valve at any desired points in the cycle of rotation; or by means of a cam made up of relatively displaceable plate members, as 43 and 44 adapted for adjustable clamping as by a nut 45, said points may be adjusted as desired on a single cam.

Pivotally mounted upon the plate 10 is a shaft or spindle 48 perpendicular to said plate and adapted to be rotated through a limited angle about its axis by means of a gear member 49 and carrying a manually operable clamping device 50 similar to that fully disclosed in U. S. Letters Patent No. 2,155,817, issued to applicant's assignee, April 25, 1939. A spiral spring 51 having one extremity attached to the spindle 48 and the other to an abutment 52 carried by the plate 10, tends to rotate the spindle 48 in a clockwise sense. A projection finger 53 attached to the gear member 49 is adapted to engage a stop 54 mounted upon the plate 10 definitely limiting the rotation of said gear member and spindle in a clockwise sense under the influence of spring 51. A constant speed electric motor 57 is arranged to drive the gear member 49 and the spindle 48 in a counter-clockwise sense by an electrically operated clutch mechanism, which may be of any one of a number of well-known forms. For example, the motor 57 may carry a gear member 58 adapted to be operatively connected to the gear member 49 by the interposition of an idler gear 59 carried by a movable arm 60. An electromagnet 61 is adapted to act upon an armature 62 carried by the arm 60 in such manner that when said electromagnet is energized the gear 59 is shifted out of engagement with the gears 58 and 49, breaking the train and allowing the spring 51 to rotate the gear 49 and the spindle 48 until the finger 53 engages the stop 54. When the magnet 61 is de-energized the gear 59 serves to complete the train between the motor 57 and the spindle 48, whereby the latter will be rotated in a counter-clockwise sense so long as said motor is in operation.

Fixed to the spindle 48 by the manually operable clamping device 47 is a disc 63 of thin metal or stiff paper adapted to be rotated by said spindle in a manner similar to that of a circular-chart recording instrument. The disc 63 is preferably graduated about its periphery in uniform divisions corresponding to units of time. Inscribed upon the disc near its periphery is a circular zone 64 concentric with the axis of spindle 48 and intersecting the graduations upon the surface. Embracing the edge of the disc 63 is an orifice element 65 having inwardly directed openings or jets 66 opposing each other and juxtaposed to the front and rear surfaces of the disc 63 within the zone 64. Connected to the orifice element 65 is a conduit 67 communicating with the interior of a bellows member 68 having a movable part 69 adapted to deflect in correspondence with fluid pressure conditions within the bellows member. A conduit 70 connected to the source of air pressure 13 is in communication with the conduit 67 through a constricted portion 71.

The combination including the orifice member 65, the bellows 68, and associated conduit parts, together with the disc 63, serves to function in a manner identical with that fully set forth in U. S. Letters Patent No. 1,880,247, issued to applicant's assignee, October 4, 1932. Upon the application of air pressure to the system through conduit 70 the disc 63, if embraced by the orifice member 65, will serve to obstruct the escape of air therefrom, causing a back pressure to be built up within the conduit 67 and the bellows 68.

A contactor 72, adapted to function as a single-pole double-throw switch, is arranged to be operated from the movable part 69 of the bellows member 68, and serves selectively to provide electrical connection between a common contact element 73 and a contact 74 or a contact 75 respectively according to whether fluid pressure is applied or released within the bellows member 68, which, in turn, depends upon the extent to which the disc 63 obstructs the escape of air from the jets of orifice member 65.

For purposes of explanation the novel process cycle controller, while not in any sense limited to such an applicaton, is shown as used in connection with a platen press 80. This press is equipped with a reversible electric motor 81 by which a platen 82 may be raised to a closed position or lowered to an open position according to the direction in which said motor is rotated. Mounted upon the press is a limit switch 83 corresponding to the closed position and a limit switch 84 corresponding to the open position. The switch 83 has an upper contact 85 and a lower contact 86 adapted to be engaged alternatively by a common contact member 87. The switch 84 has an upper contact 88 and a lower contact 89 adapted to be engaged alternatively by a common contact member 90. A tappet bar 91 carried by the platen of the press is adjusted to engage the switches 83 and 84 when the platen reaches the respective closed and open limits of its travel. When the platen is in its uppermost position, and the press closed, the contact 87 is forced into engagement with contact 85, and cleared from the contact 86. When the platen is not in its uppermost position the reverse condition of these contacts exists. When the platen is in its lowest position, the contacts of switch 84 are actuated in a sense that contact 90 is engaged with contact 89 and cleared from contact 88, the reverse condition existing when the platen is not in the lowest position.

The electrical connections by which the cycle controller is operatively associated with the platen press are as follows: The motor 81 is provided with three terminals, 92, 93, and 94, the internal connections being such that when voltage is applied between the terminals 92 and 93 the motor will be operated in a sense to close the press, and when voltage is applied between the terminals 94 and 93 the motor will be operated in a sense to open the press. From one side of a source of electric power, a conductor 96 is carried directly to one terminal each of motor 41 and electromagnet 61, and also to terminal 93 on the motor 81. The other side of the source of electric power is connected by a conductor 97 to the common contacts 87 and 90 of the switches 83 and 84 respectively. The contact 27 of contact device 24 is connected by a conductor 98 to contact 74 of contact device 72; and contact 26 of the former device by a conductor 99 to contact 75 of the latter, and also to contact 35 of contactor 34. The common contact 37 of the contactor 34 is connected by means of a conductor 100 to contact 89 of limit switch 84; and contact 36 of contactor 34 by means of a conductor 101 to the free terminal of electromagnet 61. One side of contact 39 in contactor 38 is connected to the common element 73 of contactor 72 by means of a conductor 102, and also by said conductor to the free terminal of motor 57. The other side of contact 39 is connected by a conductor 103 to the contact 85 of switch 83. One side of contact 40 of contactor 38 is connected by a conductor 104 to contact 88 of switch 84. The other side of contact 40 is connected by a conductor 105 to terminal 94 of the motor 81. The terminal 92 of motor 81 is connected by a conductor 106 to contact 86 of the limit switch 83, but includes in series therewith a normally open push button contactor 107. The common contact element 28 of contactor 24 is connected by a conductor 108 to the free terminal of motor 41.

For the purpose of establishing definite time intervals to characterize a predetermined cycle of operations, there are pierced in the disc 63 small perforations, as by an ordinary ticket punch, these preferably being somewhat elongated in a radial sense to compensate for possible eccentricity in the disc 63, and being located upon the zone 64 at its points of intersection with the graduations corresponding to the time intervals into which it is desired to have the process cycle divided. For example, the disc is shown as punched with a perforation 109 at a point on the "zero" line, and six further perforations 110, 111, 112, 113, 114, and 115, at the points corresponding respectively to time lapses of 2, 3, 9, 10, 11½ and 12 minutes from the instant of starting. The cams 17 are set and locked in positions with respect to each other and to the notches in cam 18 so that for the successive increments of advance of said last-named cam as the follower 23 passes from one notch to the succeeding notch, the valves 17 will be actuated to establish in proper sequence the various events which characterize the process cycle to be controlled.

The relative positioning of cams 18, 19, and 20 corresponding to a typical cycle involving six successive events and six dwells of the shaft 15, is shown in Fig. 8, where the line e indicates the location of the several followers with respect to said cams when the shaft 15 is in its normal position of rest. In order to effect the six increments of motion characterizing the cycle, six of the notches 21 on the cam 18 are left open, and the remaining six blocked out by the plates 30 and 31 as hereinabove set forth. Under the normal condition of rest the cam 18 stands with the follower 23 at the top of the rise from one of the indentations 21, maintaining the contacts 26 and 28 of the contactor 24 in engagement. The projecting part 32 of the cam 19 is in engagement with contactor 34 to close contacts 36 and 37 and open contacts 35 and 37. The cam 20 will lie in a position where the contactor 38 engages the smaller radius of its periphery, causing contacts 39 to be closed and contacts 40 opened, the rise 33 of said cam being set to a position in the angle of rotation to correspond with the termination of the cycle, as indicated by the line $f$ in Fig. 8, the group of cams being considered as having advanced in the direction indicated by the arrow $g$.

A typical cycle of operation may be described as follows: The disc 63 is placed on the spindle 48 and secured thereto by the clamping device 50 in a position wherein the zero graduation on the disc and the perforation 109 lie within the orifice member 65. Upon air pressure from the source 13 now being applied to the system, the presence of the opening 109 within the orifice member 65 will permit the escape of air therefrom, so that pressure will not build up within the bellows 68, and the contactor 72 will lie in the position shown in the drawing, wherein contact 75 is in electrical engagement with the contact element 73 and contact 74 out of engagement therewith.

Electric power being made available at the source, current may flow between the line conductors 97 and 96 under the above-stated conditions, only through a single path, this including contacts 89 and 90 of switch 84, conductor 100, contact member 37 and contact 36 in contactor 34, conductor 101, and the winding of electromagnet 61. Other possible paths are blocked by the spring-opened contactor 107, the open contact 40 in the contactor 38, and the open contact 35 in contactor 34. Thus, the only element of the mechanism which will be electrically energized under this condition is the electromagnet 61, which will act to hold the idler 59 out of engagement with the gear member 49, permitting the spring 51 to retain the disc 63 in its zero position as hereinbefore defined.

In order to initiate a cycle of operation, the switch 107 is manually depressed, closing its contacts and completing a circuit from conductor 97 through contacts 86 and 87 of switch 83 and conductor 106 to the terminal 92 of motor 81, and thence from terminal 93 of said motor to line conductor 96. This will cause the motor 81 to operate in a sense to close the press 80. (In actual practice the operation of motor 81 might be effected through a locking relay, permitting the switch 107 to be released once an initial contact has been made; but for purposes of simplicity this has been omitted from the specification, and it may be assumed that the switch 107 is maintained in its depressed position until the platen 82 reaches its upper limit of travel.) As soon as the platen begins to rise, the tappet arm 91 carried thereby will actuate the switch 84 in a sense to separate contacts 89 and 90, thereby de-energizing magnet 61 which will release its armature 62, causing the idler 59 to engage the gears 58 and 61 completing the mechanical train between motor 57 and spindle 48. At the same time contacts 90 and 88 of switch 84 are brought into engagement, whereby connection is provided between the line conductor 97 and conductor 104.

Upon the closing operation being completed, the tappet arm 91 will actuate the switch 83 releasing the contact 87 from engagement with contact 86 and thereby opening the circuit of motor 81 and bringing it to rest. At the same time, the contact 87 will be brought into engagement with contact 85 providing a path from line conductor 97 to conductor 103 and through the contact 39 of contactor 38 to the conductor 102, and thence through motor 57 to line conductor 96, energizing said motor, whereby the latter, acting through the mechanical train provided by the gears 58, 59, and 49, will cause the disc 63 to rotate in a counter-clockwise direction.

Closing of contacts 87 and 85 will also provide a path from line conductor 97 through conductor 103, contacts 39, and conductor 102 to the common contact 73 of contactor 72, thence through contact 75, conductor 99, contacts 26 and 28, and conductor 108 through the windings of motor 41 to line conductor 96, whereby said motor will become energized, and, acting through the gear train 42 will cause the shaft 15 and all the cams carried thereby to be rotated. Immediately upon this rotation of the shaft 15, the cams 17 will actuate such of the valves 12 as they may be set to engage, in any desired predetermined manner, and thus will serve to initiate the first event in the series constituting the controlled cycle. The rotation of shaft 15 will continue until the motion of cam 18 brings one of the notches 21 within range of the follower 23, when the latter, under the influence of spring 25, will enter said notch and actuate contactor 24 in a sense to transfer the contact 28 from engagement with the contact 26 to engagement with contact 27, thereby interrupting the flow of current through motor 41 and bringing the shaft 15 to rest.

As the motion of the plate 63 causes the perforation 109 to be moved out of range of the orifice member 65, the interposition of a solid portion of said plate between jets 66 of said orifice member will retard the escape of air from said jets and will cause pressure to be built up in the conduit 67 and the bellows 68. This will cause the contactor 72 to be actuated in a sense to close contacts 73 and 74, providing in series with contacts 27 and 28 of contactor 24 an alternative path for current whereby the motor 41 will again be energized and cause the shaft 15 to be rotated as before. This rotation will continue until the follower 23 rises out of the notch 21 on the cam 18, causing contacts 27 and 28 to be separated, thereby bringing the motor 41 to rest, and incidentally reengaging contacts 26 and 28. The settings of the cam 17 are made in such a manner that under normal operating conditions no readjustment of the valves 12 will take place during this increment of rotation.

The cam-shaft 15 will now remain at rest as the disc 63 continues its rotation, and no further event in the cycle will occur until the perforation 110 comes within range of the orifice member 65 two minutes after the starting of the cycle. Upon the perforation 110 passing between jets 66, the pressure in the bellows member 68 will again be reduced, and the contacting device 72 operated as before in a sense to cause the contact element 73 again to engage the contact 75 and to be separated from the contact 74.

There will now be provided a path for electric current through the windings of motor 41 by way of contact 28 and contacts 26 and 75 instead of contacts 27 and 74 as hereinabove described. The motor 41 will again be energized and will cause the shaft 15 to rotate to initiate the second event of the cycle, which rotation will continue until the cam follower 23 enters the succeeding one of the indentations 21 on the rim of cam 18. This action will serve to separate the contact element 28 from the contact 26, bringing the motor to rest, and at the same time engaging contacts 28 and 27 for the succeeding operation. As the disc 63 continues to rotate, the perforation 110 will move out of juxtaposition to the jets 66 of the orifice 65, causing the bellows member 68 again to be inflated, closing the contacts 74 and again advancing the motor 41 until the follower 23 reaches the periphery of the cam 18 as before.

This action is repeated as the successive perforations 111, 112, 113, and 114 come between the jets 66 of the orifice member 65. It will thus be seen that there is developed a series of increments of motion, whereby the shaft 15 is intermittently advanced at time intervals corresponding to the spacings of the perforations which have been punched in the disc 63 at the points of intersection of selected time graduations with the zone 64. For each desired transition of the cams 17 from one position to another with corresponding advances of the shaft 15, there may be made settings of said cams so that each advance will set up a valve combination corresponding to a desired event in the controlled sequence.

This series of advances and dwells will continue until the completion of the six events of the cycle as determined by the setting of cam 20 whereon the projection 33 is so positioned as to engage and operate the contactor 38 when the shaft 15 is given an increment of motion following the sixth or final event in said cycle. More specifically, the sixth step of rotation of the shaft 15 (which is initiated as the perforation 114 arrives opposite the orifice jets 66) is the final event in the particular cycle above referred to by way of illustration, and is to be followed by lowering of the platen 82 and advancing of the shaft to the appropriate position for commencing a new cycle. When the perforation 114 came opposite said jets 66, the motor 41 was energized to rotate the shaft 15 to initiate said sixth event of the cycle, said rotation continuing until the cam follower 23 entered the sixth notch or indentation 21 on the rim of the cam 18; and thereafter the removal of said perforation from the orifice jets 66 resulted in further rotation of said shaft 15 to shift the follower 23 out of said sixth notch of cam 18 and to restore said follower to the adjacent periphery of said cam. At this time the projection 33 of cam 20 is adjacent the follower or contactor 38, ready to operate said contactor as soon as further rotation of shaft 15 takes place.

Now when the perforation 115 comes within the range of the orifice member 65 and lowers the pressure in bellows 68 sufficiently to bring contactor 73 into engagement with contact 75, the motor 41 is again energized and shaft 15 again rotated. The projection 33 of cam 20 thereupon actuates the contactor 38 to open contact 39 and to close the contact 40. The positions of the cams 18, 19, and 20 with relation to their followers at this time are indicated by the line f in Fig. 8.

Opening of the circuit at the contact 39 serves to de-energize the motor 57 and also the common contact 73 of the switch 72, whereby both motors 57 and 41 are brought to rest. Closing of the circuit at contact 40 provides a path for current from line conductor 97 through contacts 90 and 88 of switch 84, conductors 104 and 105, and the winding of motor 81 to line conductor 96 to operate said motor in a sense to open the press 80 and lower the platen 82.

As the platen 82 reaches the lowest point of its travel the tappet arm 91 will engage the contact 90 of the switch 84 clearing said contact from contact 88 and thus interrupting the circuit to motor 81, whereby the latter will be brought to rest. At the same time the contacts 90 and 89 will be brought together, whereby connection will be provided between line conductor 97 and conductor 100 through contact element 37 to contact 35 and conductors 99' and 99, and thence, by contacts 26 and 28 and conductor 108, through the winding of motor 41 to the line conductor 96, energizing said motor, and causing the same to advance the shaft 15 and elements carried thereby. From Fig. 8 it will be noted that the projection 32 of cam 19 is engaged with its follower (contactor 34) only when the shaft 15 is in its normal position, at the start of a cycle; and that therefore said contactor 34 is out of engagement with contact 36 and in engagement with contact 35 throughout the rotation of shaft 15, until the latter completes a revolution from said starting position.

Because of the blocking out of unused notches 21 by the plates 30 and 31, the follower 23 will remain in a position to maintain the contacts 28 and 26 in engagement and the motor 41 will continue to operate until one revolution of the shaft 15 has been completed, and the projection 32 on the cam 19 actuates the contactor 34, clearing the common contact 37 from the contact 35 and bringing it into engagement with the contact 36. Opening of the circuit passing through contact 35 will serve to de-energize the motor 41, bringing it to rest in its starting position. Closing of the circuit completed by contact 36 will energize the electromagnet 61, causing the same to attract the armature 62, lifting the arm 60 and disengaging the gear 59 from the gear 49, whereby the latter will be released, and the spring 51 will reset the disc 63 to its starting position with the finger 53 in contact with the stop 54. Thus a complete cycle of operations will have been carried out by the cycle controller, and all elements of the instrument restored to their starting positions.

From an understanding of the above description it will be apparent that there has been provided a process cycle controller having great flexibility of adjustment and adaptable to a wide variety of applications. The valve combinations necessary to the carrying out of the various events in the cycle can be independently adjusted by the settings of the cams 17 with respect to each other and to the shaft 15. The timing of the successive events in the cycle is definitely established by the positioning of the perforations about the periphery of the disc 63; and a number of different discs may be provided in advance to meet the requirements of various process cycles as they may be affected by requirements of individual batches. The elimination of unused positions by blocking out the notches in cam 18 provides a rapid resetting action and eliminates any delay which might otherwise be experienced in the restoring of the control instrument to its starting point.

While the instrument embodying the invention has been shown in its application to the operation of an electrically actuated platen press, it will be apparent to those versed in the art that, without in any way departing from the spirit of the invention, it may be applied with equal facility to the control of such devices as tire molds, solvent-recovery processes, gas producers, oil refining plants, dyeing apparatus, the treatment of foodstuffs, or any discontinuous process requiring the accurate timing of a sequence of events.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

I claim:

1. In a process cycle controller, means for establishing successive conditions in a process cycle, an electric motor for actuating said condition-establishing means, a circuit for the same, pneumatically operated switching means for affecting said circuit to energize said motor, further switching means in said circuit for interrupting the same to bring the motor to rest, a constant speed member including fluid pressure control elements for repeatedly actuating said pneumatically operated switching means to start the motor, and means operated by said motor for repeatedly actuating said further switching means for bringing said motor to rest.

2. In a process cycle controller, means for establishing successive conditions characterizing a cycle, an electric motor for actuating said condition-establishing means, a circuit for said motor, pneumatically operated switching means to complete said circuit, means for repeatedly and at predetermined times varying fluid pressure on said switching means to operate the same, and further switching means in said circuit for interrupting the same to bring the motor to rest.

3. In a process cycle controller, means for establishing successive conditions characterizing a cycle, an electric-motor for actuating said condition-establishing means, a circuit for the same, pneumatically operated switching means including a vent and subject for operation to the obstruction or non-obstruction of said vent, a constant speed member coacting with said vent to obstruct the same and thereby to actuate said switching means in one sense, and having apertures at predetermined locations in said member adapted at predetermined times in the movement of said member to register with said vent whereby the latter will be relatively unobstructed to actuate said switch in another sense, and further switching means in said circuit for interrupting the same to bring the motor to rest.

4. In a process cycle controller, means for establishing conditions characterizing a cycle, an electric motor for actuating said condition-establishing means, a circuit for the same, pneumatically operated switching means for completing said circuit and including a vent and subject for operation to the obstruction or non-obstruction of said vent, a movable graduated member adapted to coact with said vent to obstruct the same, thereby operating said switching means in one sense, and having elements at predetermined locations with respect to the graduations on said member and adapted at predetermined times in the movement of the same to coact with said vent to relieve obstruction of the same whereby said switch will be actuated in another sense, constant speed means for moving said member, further switching means in said circuit for interrupting the same, and means actuated by said motor for repeatedly operating said last-named switching means for bringing said motor to rest.

5. In a process cycle controller, means for establishing conditions characterizing a cycle, an electric motor for actuating said condition-establishing means, a circuit for the same, pneumatically operated switching means for completing said circuit and including a vent and subject for operation to the obstruction or non-obstruction of said vent, a removable rotatable disc graduated about its periphery, and adapted to coact with said vent to obstruct the same, thereby operating said switching means in one sense, and having apertures at predetermined locations with respect to the graduations on said disc and adapted at predetermined times in the rotation of the same to register with said vent whereby the latter will be relatively unobstructed to actuate said switch in another sense, constant speed means for rotating said disc, further switching means in said circuit for interrupting the same, and means actuated by said motor for repeatedly operating said last-named switching means for bringing said motor to rest.

HAROLD E. ALLEN.

REFERENCES CITED

The following references are of record in the file of this patent:

UNITED STATES PATENTS

| Number | Name | Date |
| --- | --- | --- |
| 1,205,729 | Frink | Nov. 21, 1916 |
| 1,604,342 | Greenhut | Oct. 26, 1926 |
| 1,655,815 | Johanson | Jan. 10, 1928 |
| 1,820,252 | Shippy | Aug. 25, 1931 |
| 1,852,692 | Bryant | Apr. 5, 1932 |
| 1,865,604 | Yarnall | July 5, 1932 |
| 2,000,367 | Williamson | May 7, 1935 |
| 2,015,855 | Kerr | Oct. 1, 1935 |
| 2,119,187 | Teeple | May 31, 1938 |
| 2,185,394 | Arbogast | Jan. 2, 1940 |
| 2,204,513 | Sanberg et al. | June 11, 1940 |
| 2,204,531 | Erbguth et al. | June 11, 1940 |
| 2,204,532 | Erbguth et al. | June 11, 1940 |
| 2,290,626 | Bosomworth | July 21, 1942 |
| 2,308,948 | Bosomworth | Jan. 19, 1943 |